United States Patent
Hosonuma et al.

(10) Patent No.: US 7,217,347 B2
(45) Date of Patent: May 15, 2007

(54) DIAMOND ELECTRODE FOR ELECTROLYSIS

(75) Inventors: Masashi Hosonuma, Fujisawa (JP); Miwako Nara, Fujisawa (JP); Masaharu Uno, Fujisawa (JP); Yoshinori Nishiki, Fujisawa (JP); Tsuneto Furuta, Fujisawa (JP); Tateki Kurosu, Hiratsuka (JP); Osamu Fukunaga, Ichikawa (JP); Tetsuro Tojo, Osaka (JP)

(73) Assignee: Permelec Electrode Ltd., Kanagawa (JP)

( * ) Notice: Subject to any disclaimer, the term of this patent is extended or adjusted under 35 U.S.C. 154(b) by 454 days.

(21) Appl. No.: 10/823,752

(22) Filed: Apr. 14, 2004

(65) Prior Publication Data

US 2004/0206624 A1 Oct. 21, 2004

(30) Foreign Application Priority Data

Apr. 15, 2003 (JP) ............... P. 2003-109858

(51) Int. Cl.
*C25B 11/12* (2006.01)
(52) U.S. Cl. ............... 204/294; 204/291; 204/290.01; 428/408; 423/446; 427/249.8
(58) Field of Classification Search ............... 204/294, 204/290.01, 291; 428/408; 423/446; 427/249.8
See application file for complete search history.

(56) References Cited

U.S. PATENT DOCUMENTS

| | | |
|---|---|---|
| 4,912,286 A | 3/1990 | Clarke |
| 5,399,247 A | 3/1995 | Carey et al. |
| 5,900,127 A | 5/1999 | Iida et al. |
| 6,375,827 B1 | 4/2002 | Kurosu et al. |
| 2002/0134674 A1* | 9/2002 | Andrews et al. ............ 204/242 |
| 2003/0162087 A1 | 8/2003 | Clarke et al. |

FOREIGN PATENT DOCUMENTS

| | | |
|---|---|---|
| EP | 0 994 074 A2 | 4/2000 |
| EP | 1 489 200 A1 | 12/2004 |
| WO | WO 97/32720 A1 | 9/1997 |

OTHER PUBLICATIONS

European Search Report dated Aug. 10, 2004.
J. R. Smith et al., "Electrode based on Magnéli phase titanium oxides: the properties and applications of Ebonex® materials" (1998) Journal of Applied Electrochemistry, vol. 28, pp. 1021-1033 *.
EPO Official Communication dated Jul. 26, 2005.
European Search Report dated Dec. 12, 2005.

* cited by examiner

*Primary Examiner*—Bruce F. Bell
(74) *Attorney, Agent, or Firm*—Sughrue Mion, PLLC

(57) ABSTRACT

A diamond electrode having a prolonged life by combining a conventional diamond electrode having a relatively short life with other components is provided. A diamond electrode for electrolysis includes an electrode substrate, at least the surface of which comprises Magneli phase titanium oxide, and conductive diamond supported as an electrode catalyst on a surface of the electrode. The electrode catalyst may contain a titanium oxide powder. Magneli phase titanium oxide improves conductivity without forming a stable oxide layer on the substrate surface.

13 Claims, 1 Drawing Sheet

DIAMOND ELECTRODE FOR ELECTROLYSIS

FIELD OF THE INVENTION

The present invention relates to a diamond electrode for electrolysis, which is capable of efficiently electrolyzing objective substances contained in waste water or drinking water and adversely affecting human bodies and environment, thereby making them harmless, has excellent durability as an industrial anode and has high oxidizing ability.

DESCRIPTION OF THE RELATED ART

An electrolysis process can generate hydrogen, oxygen, ozone, hydrogen peroxide, etc. in aqueous solution systems by controlling chemical reaction on the electrode surface utilizing clean electric energy and is a basic technique generally used in electrolysis of sodium chloride, electrolytic plating, extraction of metal, etc. as industrial electrolysis. Recently, the electrolysis process is being utilized for waste water treatment because it is possible to indirectly decompose organic pollutants, or to adsorb the pollutants onto an electrode, thereby directly electrolyzing them.

On the other hand, it is known that according to anodic oxidation reaction in electrolysis, oxidizers (for example, effective chlorine and ozone) effective for water treatment are formed and that active species such as an OH radical are partially generated. Water containing them is generally used as a name such as active water, functional water, ionic water, and sterile water.

However, even in the electrolysis process, it is pointed out that objective reaction does not sufficiently proceed depending upon electrode materials. In general, according to anodic oxidation reaction of electrolysis in an aqueous solution, the electrolysis proceeds with water as a raw material, to obtain an electrolytic product. However, in many cases, in electrode catalysts having high reactivity against discharge of water, oxidation of other co-existing substances does not readily proceed.

As materials of an electrode (anode) for electrolysis to be used for carrying out oxidation, lead oxide, tin oxide, platinum, DSA, carbon, and the like are used. Also, materials that can be used as an electrode substrate are required to have a long life and have corrosion resistance such that staining on the treated surface does not occur. Materials for an anode substrate are limited to valve metals such as titanium and alloys thereof. Electrode catalysts are also limited to noble metals such as platinum and iridium and oxides thereof.

Even if such an expensive material is used, it is known that when a current is flown, the material is exhausted corresponding the current density or current-carrying time and eluted into an electrolytic solution. Thus, electrodes having more excellent corrosion resistance are being desired.

Graphite and amorphous carbon materials have hitherto been used as an electrode material. However, in particular, these materials are markedly exhausted under anodic polarization.

Diamond as the same carbon based material is excellent in thermal conductivity, optical transmissibility, and durability against high temperatures and oxidation. In particular, since it is possible to control electric conductivity by doping, diamond is promising as a semiconductor device or energy conversion element.

Recently, it is reported that diamond having such characteristics is far excellent in stability in an acidic electrolytic solution as compared with other carbon materials, and it is suggested that diamond is promising as an electrochemical electrode [see Swain et al., *Journal of Electrochemical Society*, Vol. 141, 3382-(1994)].

U.S. Pat. No. 5,399,247 suggests that organic waste water can be decomposed using diamond as an anode material. JP-A-2000-226682 proposes a method of carrying out water treatment using conductive diamond as an anode and a cathode. Further, JP-A-2000-254650 proposes a method of carrying out water treatment using conductive diamond as an anode and a gas diffusion cathode for generating hydrogen peroxide as a cathode.

Any industrial application of a diamond electrode in a high potential region under a high current density has not been reported yet. However, recently, it is reported that the diamond electrode is inert against decomposition reaction of water and forms ozone in addition to oxygen (see JP-A-11-269685).

From these researches, according to the electrolysis process using diamond as an electrode, an enhancement of the efficiency is expected as compared with the case using a conventional electrode. On the other hand, improvements have been desired from the following viewpoint of practical use.

As a method of preparing diamond films, a heat filament CVD method, a microwave plasma CVD method, a plasma arc jet method, a PVD method, and the like are developed. In the CVD method as a general production method of diamond, since a high-temperature reduction step of 700° C. or higher is employed, it is essential that a coefficient of thermal expansion of a substrate is closed to that of diamond. For substrates of a diamond electrode, metallic silicon whose coefficient of thermal expansion is closed to that of diamond is usually used. However, since this metallic silicon is low in mechanical strength, its size is limited so that it is difficult to make it large in size.

Since the shape of electrodes to be used for industrial electrolysis is complicated, it is also preferred to use metallic substrates that are easy for processing and high in mechanical strength. In particular, as metals that are stable in acidic solutions in an anodic potential region, valve metals are known. Of these metals, it is investigated to use niobium substrates while taking into consideration the matter that they hardly form a hydrogenated product in a hydrogen atmosphere.

However, there may be the case where even improved diamond electrodes are poor in life so that they cannot be applied depending the application field. As a result of investigating the cause, it is confirmed that in large-sized electrodes, scattering in the quality of diamond (deposition of non-diamond components) is caused due to a difference of the coefficient of thermal expansion between the substrate and the electrode substance and heterogeneity of CDV devices, whereby defects such as pinholes and cracks are inevitably generated.

In order to provide a stable anode, it is necessary to keep durability of a substrate. For the purposes of obtaining adhesion of a diamond film to a substrate and protecting the substrate, it is proposed to form an interlayer such as carbides on the substrate surface (see JP-A-9-268395). It has been old known that the effect of the interlayer is a basic technique for prolonging the life of a noble metal oxide electrode in an acidic electrolytic bath (see JP-A-57-192281). However, even if such an oxide interlayer is formed, since radicals such as hydrogen are generated under diamond synthesis conditions by the CVD method, the greater part of the interlayer is reduced, and therefore, it is not simple to apply the subject technique.

On the other hand, if a conductive diamond powder obtainable by the ultra-high pressure synthesis method or the like is molded using a binder such as resins, it can become an electrode form that can be applied to electrolysis. Also, there is proposed a method of fixing powdery diamond from a valve metal salt by heat decomposition (see JP-A-11-269685 cited previously). Any of the cases were insufficient in view of durability and bonding strength to the substrate.

Under these circumstances, it is very desirable that diamond electrodes that can be used for industrial electrolysis can be further improved.

Magneli phase titanium oxide is an oxide represented by a chemical formulation, $Ti_nO_{2n-1}$, wherein n is from 4 to 10 and has such a characteristic feature that it has high durability in an oxidative corrosion atmosphere. This Magneli phase titanium oxide is, for example, synthesized by a method in which $TiO_2$ is used as a raw material and reduced at high temperatures under a hydrogen atmosphere. An electrode containing this Magneli phase as an electrode composition is called "EBONEX" (a registered trademark) and generally used in the field of industrial electrolysis. While it is known that this electrode has excellent durability in an electrolytic bath having large corrosion resistance, it is impossible to flow a large current. For the sake of overcoming this defect, it is proposed to support a catalyst such as iridium oxide, tin oxide, ruthenium oxide, platinum, and lead oxide on the electrode (*Journal of Applied Electrochemistry*, Vol. 28, 1021–1033 (1998)).

If metallic titanium is electrolyzed, a strong electric field is formed in the vicinity of the surface thereof. Since this electric field becomes a drive force for growing an anodically oxidized film, once formed $TiO_2$ or hydrated $TiO_2$ becomes an irreversible compound against metallic titanium. On the other hand, it is said that according to a catalytic action of Magneli phase titanium, catalytic oxidation proceeds with repetition of small increase and decrease of $Ti_nO_{2n-1}$. That is, the Magneli phase performs electrode reactions such as generation of oxygen during repetition of small n by the electrolysis but does not perform formation of irreversible $TiO_2$.

SUMMARY OF THE INVENTION

The present inventors have paid attention to the characteristic features of the diamond electrode and Magneli phase titanium.

An object of the present invention is to provide an electrode for electrolysis that can be used in a variety of electrolyses and cannot be realized according to the conventional techniques through an accurate combination of the diamond electrode and Magneli phase titanium.

The present invention provides a diamond electrode for electrolysis comprising an electrode substrate, at least the surface of which comprising Magneli phase titanium oxide, and an electrode catalyst comprising a conductive diamond, supported on a surface of the electrode substrate.

The electrode catalyst may comprise a mixture of the conductive diamond powder and a Magneli phase titanium oxide powder.

The conductive diamond can be supported by a chemical vapor deposition method.

IN THE DRAWINGS

Figure 1:
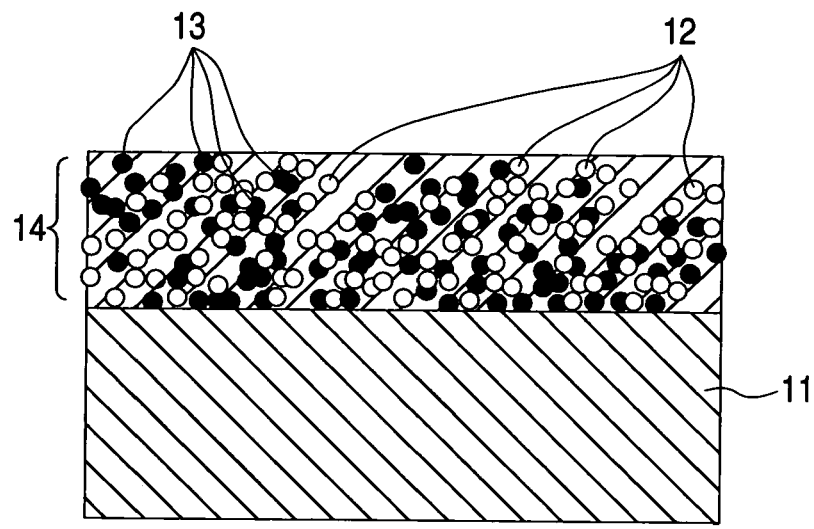
FIG. 1 is a longitudinal section showing one embodiment of the electrode for electrolysis according to the present invention.

11: Magneli phase titanium oxide substrate
12: Diamond powder
13: Titanium oxide powder
14: Catalyst layer
21, 21A: Titanium oxide powder
22: Substrate
23: Diamond powder
24: Catalyst layer
31: Magneli phase titanium oxide substrate
32: Conductive diamond

DETAILED DESCRIPTION OF THE INVENTION

The present invention is described in detail below.

A diamond thin film electrode having high oxidizing ability is hardly applied in the form of a single body as an industrial electrode from the standpoints of thickness and costs. Accordingly, in particular, the present invention provides an electrode for electrolysis having high catalytic ability by using a conductive diamond powder as an electrode catalyst and combining it with other material. Alternatively, it is possible to form a conductive diamond film on a Magneli phase electrode by CVD or the like.

In the present invention, the other material means Magneli phase titanium oxide having excellent durability and conductivity which is used as an electrode substrate. If the substrate surface is formed of Magneli phase titanium oxide as described above, this Magneli phase titanium oxide does not perform formation of irreversible $TiO_2$, whereby a stable oxide layer is not formed on the substrate surface. As a result, enhancement of the conductivity can be achieved.

In addition, since this substrate is strong against a hydrogen reductive atmosphere, diamond can be directly deposited thereon by the conventional CVD (Chemical Vapor Deposition) method. The deposited diamond particles are firmly held on the substrate surface, thereby enabling one to realize stable operation over a long period of time.

However, in an electrode in which a slurry containing diamond particles is coated on this substrate surface and then baked to form a diamond layer as a catalyst, adhesion of the Magneli phase titanium oxide substrate to the diamond particles is insufficient so that the diamond particles on the substrate surface drop out of the substrate during the electrolysis, often resulting in an increase of voltage.

Where a catalyst layer containing the diamond particles is formed by slurry coating and baking, it is desired to use Magneli phase titanium oxide having an affinity with Magneli phase titanium oxide of the substrate or other titanium oxide particles, together with the diamond particles.

The electrode for electrolysis according to the present invention can be used in electrochemical methods such as waste water treatment, synthesis of functional water, and inorganic or organic electrolytic synthesis.

Figure 2:
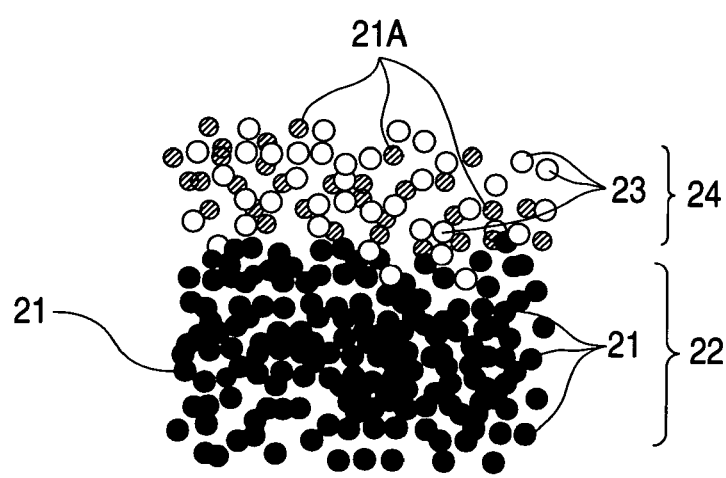
FIG. 2 is a longitudinal section showing another embodiment of the electrode for electrolysis according to the present invention.
Figure 3:
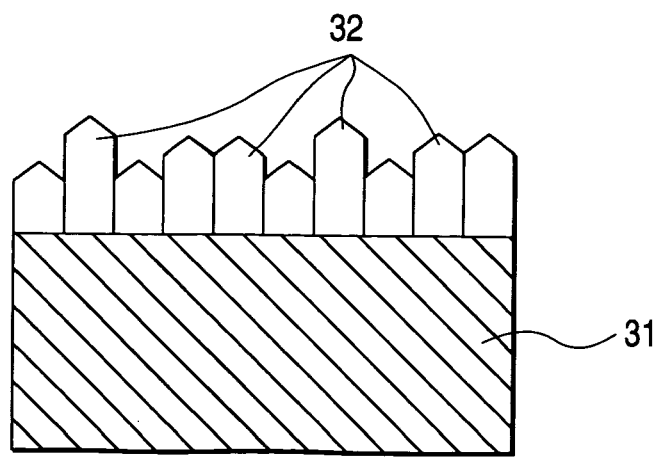
FIG. 3 is a longitudinal section showing a still another embodiment of the electrode for electrolysis according to the present invention.

The diamond electrode according to the present invention includes the following three embodiments shown in FIGS. 1 to 3.

(1) A Magneli phase titanium oxide substrate 11 is provided. A slurry of a mixed powder of a diamond powder 12 and a titanium oxide ($TiO_2$) powder 13 is coated on the substrate 11 and baked in vacuo at high temperatures to form a catalyst layer 14 on the substrate 11 (FIG. 1).

(2) A slurry comprising a titanium oxide powder 21, which will become a substrate, is dried and molded by a press to form a substrate 22. A slurry of a mixed powder of a diamond powder 23 and a titanium oxide powder 21A is coated on the surface of the substrate 22. The substrate 22 and the mixed slurry are simultaneously baked in vacuo at high temperatures to convert the titanium oxide powder 21 in the substrate and the titanium oxide powder 21A in the mixed powder into Magneli phase titanium oxide. Thus, a catalyst layer 24 of a mixed powder comprising the diamond powder 23 and the Magneli phase titanium oxide powder 21 is formed on the surface of the Magneli phase titanium oxide substrate 22 (FIG. 2).

(3) A Magneli phase titanium oxide substrate 31 is provided. Conductive diamond 32 is deposited on this substrate surface (FIG. 3).

For the slurry coating and baking in (1) and (2) above, conventional production methods of Magneli phase titanium oxide can be used. That is, a titanium oxide powder or Magneli phase titanium oxide having a particle size of 1–100 μm as a raw material is wetted by the addition of a suitable solvent (for example, water or isopropyl alcohol). To increase the viscosity and obtain a uniform slurry, an appropriate solvent (for example, polyethylene oxide or methyl cellulose) is further added thereto and mixed therewith.

The powder slurry is charged in a pressing device and molded under a pressure of 0.5–100 MPa so as to have desired shape and voids. The range of pressure under which good molding can be performed is about 10–80 MPa. In this regard, it is desired to heat the powder slurry at 300–400° C., thereby substantially completely decomposing the solvent. Thereafter, the temperature is gradually raised, and the resulting powder is heated at a temperature of 950–1,250° C., and preferably 1,000–1,200° C., and maintained in an inert atmosphere at this temperature for from several hours to about one day. Thus, Magneli phase titanium oxide represented by $Ti_4O_7$ is formed.

A mixing ratio of the diamond powder to the titanium oxide powder/Magneli phase titanium oxide powder to form a catalyst layer is determined taking into consideration an effective area of the electrode catalyst, a holding force of the diamond powder in the sintered catalyst layer, and the like, and is preferably from 1/20 to 20/1 in terms of volume ratio. A thickness of the catalyst layer is determined taking into consideration the electrode costs and performance. In general, the thickness of each of the diamond deposited layer and the diamond-titanium oxide mixed layer is preferably 1–100 μm.

The particles for Magneli phase titanium oxide prior to baking may be either titanium oxide particles or Magneli phase titanium oxide particles, and at this point of time, these particles are not required to be conductive. In the case of using Magneli phase titanium oxide particles, reduction operation is performed using hydrogen or carbon before and after sintering the mixed powder at high temperatures. The graphitization temperature of diamond in the oxidative atmosphere is about 800° C., and where the sintering temperature reaches this temperature, treatment in an inert atmosphere is necessary.

According to the method (3) above, polishing the substrate surface prior to vapor deposition can contribute to an improvement of the adhesion, and is therefore desirable. To give the diamond powder as a nucleus to the substrate surface at the time of polishing is effective for growth of a uniform diamond layer.

Diamond is produced under ultrahigh pressure or by a heat filament CVD method, a microwave plasma CVD method, a plasma arc jet method, a PVD method, etc. In particular, the diamond powder can be produced by the conventional ultrahigh pressure method or plasma arc jet method, or the like, but the present invention is not limited thereto.

The heat filament method that is a representative production method of diamond will be described below.

An organic compound such as alcohols as a carbon source is kept in a reductive atmosphere of a hydrogen gas, etc., and a filament is heated at a temperature of 1,800–2,400° C. at which a carbon radical is formed. An electrode substrate is disposed in the atmosphere such that the temperature reaches a temperature region (750–950° C.) at which diamond is deposited. At this time, a desired concentration of the raw material organic compound to hydrogen is 0.1–10% by volume; a feed rate varies depending upon the size of a reactor and is generally 0.01–10 liters/min; and a partial pressure is 15–760 mmHg.

To obtain good conductivity of diamond, it is indispensable to add trace amounts of elements having a difference valence, and the content of boron and phosphorus is preferably 1–100,000 ppm, and more preferably 100–10,000 ppm. Specific examples of the compound include boron oxide and diphosphorus pentoxide, both of which have low toxicity.

The CVD condition in producing the diamond catalyst is set up such that Magneli phase titanium oxide is stable. In the method (3) above, since diamond is synthesized in the hydrogen atmosphere, there is no chemical change of Magneli phase titanium oxide at the time of synthesis of diamond. Basically, only physical expansion and contraction occur, and even when cracks generate after the formation of diamond, the substrate is Magneli phase titanium oxide, and desired durability is maintained as an electrode for electrolysis.

As a representative method of generating a conductive diamond powder by the ultrahigh pressure method, the following process can be used.

A mixture of a highly crystalline graphite powder and an arbitrary compounding amount of a crystalline boron powder, or a mixture of a highly crystalline graphite molded article containing boron in the structure thereof and a diamond conversion catalyst (an alloy comprising iron, cobalt and nickel is a representative catalyst) is charged in a high-pressure device and maintained under a pressure of 5–6 GPa at a temperature of about 1,500–1,600° C. for about 2–15 minutes, thereby converting the raw material graphite into diamond; the metallic components of the recovered product are removed by acid treatment or the like; and the diamond particles are then pulverized and classified, whereby a conductive diamond powder of about 1–5 μm can be easily obtained. Where a finer powder is required, if the pulverization efficiency is enhanced by means of a vibration mill or the like, a finer powder of 1 μm or smaller is obtained. These fine powders can be used as an electrode forming material in the Examples described hereinafter.

The shape of the electrode substrate can be made in the form of granule, fiber, plate, or perforated plate. Even where the electrode substrate is molded in the form of plate, since the powder is the raw material, a porosity can be appropriately adjusted. In view of the substrate, it is preferable from the standpoint of suppressing penetration of an electrolytic solution that the porosity is small as possible. On the other hand, since it is important for the catalyst layer to have a three-dimensional effective area to some extent, it is desired that the porosity is large. The porosity of the electrode substrate is preferably 10–90%.

Although the electrode substrate of the present invention comprises Magneli phase titanium oxide, it may contain small amounts of other metals or metal oxides. Further, when a metal such as titanium and tantalum is bonded to the substrate, the mechanical strength is increased, and it is also possible to prevent penetration of the electrolytic solution from small gaps among the particles. The thickness of Magneli phase titanium oxide in this case is 0.1–10 mm.

Examples of production of an electrode for electrolysis according to present the invention and Comparative Examples will be described below, but it should not be construed that the invention is limited thereto.

EXAMPLE 1

Magneli phase titanium oxide was produced in the following manner.

Suitable amounts of water and isopropyl alcohol were added to a titanium oxide powder (particle size: about 1 μm) as a raw material, to which was then further added polyethylene oxide, and the resulting mixture was mixed to obtain a viscous uniform slurry.

This slurry was charged in a container of a pressing device and molded under a pressure of 20 MPa. The temperature was gradually raised, and the molded article was sintered at a temperature of 1,050° C. for 10 hours. A hydrogen gas was then introduced, and the sintered product was maintained in a reductive atmosphere for 6 hours. Thus, a Magneli phase titanium oxide plate (thickness: 2 mm) containing $Ti_4O_7$ as the major component was prepared.

This plate was divided into two pieces, and one of the pieces was used as a substrate as it was, whereas the other was pulverized and used for a catalyst described later.

A conductive diamond powder containing 3,000 ppm of boron, which was prepared by the ultrahigh pressure method, was used.

This diamond powder was mixed with the Magneli phase titanium oxide powder obtained above at a formulation ratio of 1/1 (by volume). Suitable amounts of water and isopropyl alcohol were added to this mixture, to which was then further added polyethylene oxide, and the resulting mixture was mixed to obtain a viscous uniform slurry. This slurry was spread on the Magneli phase titanium oxide plate, and the plate was then placed in a pressing device and molded under a pressure of 20 MPa. The temperature was gradually raised, and when the temperature reached 1,050° C., the molded article was sintered in vacuo (pressure: $10^{-4}$ Torr) for 3 hours, to obtain a Magneli phase titanium oxide plate having a mixed powder catalyst layer supported thereon. The catalyst layer had a thickness of 50 μm.

A plate having an area of 1 cm$^2$ was cut out from this Magneli phase titanium oxide plate and used as an anode. A zirconium plate having an area of 1 cm$^2$ was used as a counter electrode, and an electrolytic cell having an interval between the electrodes of 1 cm was assembled. Water electrolysis was carried out using 150 g/liter of sulfuric acid as an electrolytic solution under a condition at an electrolysis temperature of 60° C. and at a current density of 2 A/cm$^2$. As a result, a stable cell voltage was maintained for 4,500 hours so that it was confirmed that the electrolytic cell can be used over a long period of time.

EXAMPLE 2

A Magneli phase titanium oxide plate containing $Ti_4O_7$ as the major component, which was prepared under the same conditions as in Example 1, was once pulverized to form a powder. Suitable amounts of water and isopropyl alcohol were added to a part of this powder, to which was then further added polyethylene oxide, and the resulting mixture was mixed to obtain a viscous uniform slurry.

This slurry (for a substrate) was charged in a container of a pressing device.

A diamond powder prepared by the CVD method and the remaining Magneli phase titanium oxide power were mixed in a formulation ratio of 1/2 (by volume) in the same manner as in Example 1. The mixture was spread on the slurry obtained above and molded under a pressure of 20 MPa. The temperature was gradually raised, and when the temperature reached 1,050° C., the molded article was sintered in vacuo (pressure: $10^{-4}$ Torr) for 10 hours. Thus, an electrode in which the substrate was comprised of Magneli phase titanium oxide was prepared, and conductive diamond was sintered on the titanium oxide. The catalyst layer had a thickness of 50 μm.

A plate having an area of 1 cm$^2$ was cut out from this Magneli phase titanium oxide plate and used as an anode. Electrolysis was carried out under the same conditions as in Example 1. As a result, a stable cell voltage was kept for 4,500 hours so that it was confirmed that the electrolytic cell can be used over a long period of time.

EXAMPLE 3

An electrode, in which the substrate was comprised of Magneli phase titanium oxide and conductive diamond was sintered on the titanium oxide, was prepared in the same manner as in Example 1, except preparing a mixed powder slurry of a diamond powder and a Magneli phase titanium oxide powder at a formulation ratio of 1/1 (by volume) and setting up the pressure at the time of sintering at high temperatures at 1 MPa and the sintering time at 24 hours, respectively.

Electrolysis was carried out under the same conditions as in Example 1. As a result, a stable cell voltage was maintained for 3,500 hours so that it was confirmed that the electrolytic cell can be used over a long period of time.

EXAMPLE 4

A Magneli phase titanium oxide plate prepared according to Example 1 was used as a substrate, and diamond was directly deposited on the substrate surface using a hot filament CVD device under the following conditions. The deposited thickness was about 10 μm.

The substrate surface was polished with a polisher composed of diamond fine particles (particle size: about 3 μm) as separately prepared. After activation of the surface, flattening and nucleus formation, the substrate was installed in a heat filament CVD device. Ethyl alcohol having 1,500 ppm of boron oxide dissolved therein was used as a carbon source.

A hydrogen gas was flown at a rate of 0.01 liter/min, and a part of the hydrogen gas was bypassed into a carbon source container such that the ethyl alcohol gas concentration against hydrogen was 1% by volume. A current was flown into the filament while flowing these gases into the device, and the temperature was raised to a temperature of 1,800–2,400° C. at which carbon containing radical was generated.

The temperature of the substrate just beneath the filament was measured and found to be 800° C.

The CVD operation was continued for 5 hours, and the substrate was then taken out and analyzed by means of Raman spectroscopic analysis. As a result, it was confirmed that a diamond layer was deposited, and its thickness was found to be 10 μm from an electron microscopic photograph. Electrolysis was carried out under the same conditions as in Example 1. As a result, a stable cell voltage was maintained for 4,000 hours so that it was confirmed that the electrolytic cell can be used over a long period of time.

COMPARATIVE EXAMPLE 1

A silicon substrate was used in place of the Magneli phase titanium oxide substrate, and the same diamond as in Example 2 was formed to a thickness of 10 μm on the surface of the silicon substrate. Electrolysis was carried out under the same conditions as in Example 2. As a result, the electrolysis life was 4,000 hours, the value of which was substantially equivalent to that in Example 2.

COMPARATIVE EXAMPLE 2

A niobium substrate was used in place of the Magneli phase titanium oxide substrate, and the same diamond as in Example 2 was formed to a thickness of 10 μm on the surface of the niobium substrate. Electrolysis was carried out under the same conditions as in Example 2. As a result, after a lapse of 200 hours, the voltage abruptly increased. Turning on electricity was stopped, and the electrode surface was observed. As a result, separation of the diamond layer proceeded, and the substrate was corroded.

COMPARATIVE EXAMPLE 3

Using the Magneli phase titanium oxide plate as a substrate, a slurry consisting of diamond powder was spread on the substrate. Using this substrate, a diamond electrode was prepared under the same sintering conditions as in Example 1. Because the diamond powder could not be fixed to the substrate, when electrolysis was carried out under the same conditions as in Example 1, the diamond powder fell from the substrate, and as a result, voltage abruptly increased.

The present invention provides a diamond electrode for electrolysis comprising an electrode substrate, at least the surface of which comprises Magneli phase titanium oxide, and conductive diamond supported as an electrode catalyst on the electrode.

Magneli phase titanium oxide constituting the substrate achieves an improvement of conductivity without forming a stable oxide layer on the substrate surface. Further, since this substrate is strong against a hydrogen reductive atmosphere, it is possible to directly deposit diamond by the usual CVD method. The deposited diamond particles are firmly held on the substrate surface, thereby enabling one to realize stable operation over a long period of time.

It should further be apparent to those skilled in the art that various changes in form and detail of the invention as shown and described above may be made. It is intended that such changes be included within the spirit and scope of the claims appended hereto.

This application is based on Japanese Patent Application No. 2003-109858 filed Apr. 15, 2003, the disclosure of which is incorporated herein by reference in its entirety.

What is claimed is:

1. A diamond electrode for electrolysis comprising an electrode substrate, at least the surface of which comprises Magneli phase titanium oxide, and conductive diamond supported as an electrode catalyst on a surface of the electrode, wherein a volume ratio of the conductive diamond powder to the Magneli phase titanium oxide powder is from 1/20 to 20/1.

2. The diamond electrode for electrolysis as claimed in claim 1, wherein the electrode substrate is a Magneli phase titanium oxide substrate.

3. A diamond electrode for electrolysis comprising an electrode substrate, at least the surface of which comprises Magneli phase titanium oxide, and a mixture of a conductive diamond powder and a Magneli phase titanium oxide powder, supported as an electrode catalyst on a surface of the electrode, wherein a volume ratio of the conductive diamond powder to the Magneli phase titanium oxide powder is from 1/20 to 20/1.

4. The diamond electrode for electrolysis as claimed in claim 3, wherein the electrode substrate is a Magneli phase titanium oxide substrate.

5. A diamond electrode for electrolysis comprising an electrode catalyst including a mixture of conductive diamond powder and a Magneli phase titanium oxide powder arranged on a Magneli phase titanium oxide substrate, prepared by
   (i) charging a container of a pressing device with a first slurry of a Magneli phase titanium oxide powder;
   (ii) spreading a second slurry comprising a conductive diamond powder and a Magneli phase titanium oxide powder on the first slurry; and
   (iii) molding under pressure and sintering.

6. The diamond electrode for electrolysis as claimed in claim 5, wherein a volume ratio of the conductive diamond powder to the Magneli phase titanium oxide powder in the electrode catalyst is from 1/20 to 20/1.

7. The diamond electrode for electrolysis as claimed in claim 5, wherein the electrode catalyst contains at least 5 vol % Magneli phase titanium oxide powder.

8. A diamond electrode for electrolysis comprising an electrode substrate, at least the surface of which comprises Magneli phase titanium oxide, and a mixture of a conductive diamond powder and a Magneli phase titanium oxide powder, supported as an electrode catalyst on a surface of the electrode substrate, prepared by:
   (i) spreading a slurry comprising conductive diamond powder and Magneli phase titanium oxide powder onto a Magneli phase titanium oxide plate; and
   (ii) molding under pressure followed by sintering to obtain a Magneli phase titanium oxide plate having a mixed powder catalyst layer supported thereon.

9. The diamond electrode for electrolysis as claimed in claim 8, wherein a volume ratio of the conductive diamond powder to the Magneli phase titanium oxide powder in the electrode catalyst is from 1/20 to 20/1.

10. The diamond electrode for electrolysis as claimed in claim 8, wherein the electrode catalyst contains Magneli phase titanium oxide powder in an amount of at least 5 vol %.

11. A diamond electrode for electrolysis comprising an electrode substrate, at least the surface of which comprises Magneli phase titanium oxide, and conductive diamond supported as an electrode catalyst on a surface of the electrode, prepared by:
   (i) charging a first slurry of a Magneli phase titanium oxide powder into a container of a pressing device;

(ii) spreading a second slurry comprising a conductive diamond powder and a Magneli phase titanium oxide powder on the first slurry; and (iii) molding under pressure and then sintering to obtain an electrode comprising conductive diamond sintered on a Magneli phase titanium oxide substrate.

12. The diamond electrode for electrolysis as claimed in claim 11, wherein a volume ratio of the conductive diamond powder to the Magneli phase titanium oxide powder in the electrode catalyst is from 1/20 to 20/1.

13. The diamond electrode for electrolysis as claimed in claim 11, wherein the electrode catalyst contains Magneli phase titanium oxide powder in an amount of at least 5 vol %.

* * * * *